(12) United States Patent
Adamek et al.

(10) Patent No.: US 6,420,798 B2
(45) Date of Patent: *Jul. 16, 2002

(54) DEVICE FOR SETTING THE LENGTH OF A TOP LINK OF AN ATTACHING DEVICE OF A TRACTOR

(75) Inventors: Wolfgang Adamek, Lohmar; Herbert Coenen, Königswinter; Holger Jung, Aldenhoven, all of (DE)

(73) Assignee: GKN Walterscheid GmbH (DE)

( * ) Notice: Subject to any disclaimer, the term of this patent is extended or adjusted under 35 U.S.C. 154(b) by 0 days.

This patent is subject to a terminal disclaimer.

(21) Appl. No.: 09/767,933

(22) Filed: Jan. 23, 2001

Related U.S. Application Data

(63) Continuation of application No. 09/179,160, filed on Oct. 26, 1998, now Pat. No. 6,218,737.

(30) Foreign Application Priority Data

Oct. 30, 1997 (DE) .......................................... 197 47 949

(51) Int. Cl.[7] .................................................. B60L 1/00
(52) U.S. Cl. ...................................... 307/9.1; 307/10.1
(58) Field of Search ................................ 307/9.1, 10.1; 172/2, 10, 239; 701/50

(56) References Cited

U.S. PATENT DOCUMENTS

| | | |
|---|---|---|
| 4,495,577 A | 1/1985 | Strunk et al. |
| 4,508,178 A | 4/1985 | Cowell et al. |
| 4,535,847 A | 8/1985 | Hasegawa et al. |
| 4,553,605 A | 11/1985 | Katayama et al. |
| 4,775,940 A | 10/1988 | Nishisa et al. |
| 6,218,737 B1 * | 4/2001 | Adamek et al. ............ 307/10.1 |

FOREIGN PATENT DOCUMENTS

| | | |
|---|---|---|
| DE | 2 025 040 | 7/1972 |
| DE | 40 01 495 A1 | 4/1991 |
| GB | 2106767 | 4/1983 |
| JP | 401265803 A | * 10/1989 |
| JP | 404030708 A | * 2/1992 |
| JP | 409238518 A | * 9/1997 |

OTHER PUBLICATIONS

English Translation of Abstract of JP404030708A, Pub date: Feb. 3, 1992.*
English Translation of Abstract of JP409238518A, Pub date: Sep. 16, 1997.*
English Translation of Abstract of JP401265803A, Pub date: Oct. 23, 1989.*
Publication entitled "Hydraulic Top Link with Hook" of GKN Walterscheid GmbH, Lohmar, Germany (TAS 156/I D/GB/F 996 G10–I 309562).

* cited by examiner

*Primary Examiner*—Josie Ballato
*Assistant Examiner*—Sharon Polk
(74) *Attorney, Agent, or Firm*—Harness, Dickey & Pierce, P.L.C.

(57) ABSTRACT

A device for setting the length of a top rink (7) of an attaching device of a tractor (1) has a piston/cylinder unit (14) for length setting purposes. The piston/cylinder (14) has a displacement sensor (20) which records the respective actual length setting of the top link (7). The displacement sensor (20) generates an actual proportional length signal. A lift position sensor (13) is provided which generates an electric signal representing the respective actual lift position of the lower steering arms (4). A nominal length setting of the top link (7), which refers to the respective actual lift position, can be stored in a storage unit (33). When a new actual lift position is reached during the automatic mode of operation, it is possible to generate an electric control signal which corresponds to the nominal length setting of the top link (7). The signal is transmitted to the comparator of a control unit (34). The comparator compares the control signal with the actual length signal. The control unit controls the piston/cylinder (14) as a function of the deviation of the signals from one another, towards a nominal length setting. In this way it is possible, automatically, to achieve optimum kinematics for an implement attached to a tractor, without any outside interference.

6 Claims, 4 Drawing Sheets ived, which facilitates handling.
DEVICE FOR SETTING THE LENGTH OF A TOP LINK OF AN ATTACHING DEVICE OF A TRACTOR This application is a continuation of Ser. No. 09/179,160 Oct. 26, 1998, now U.S. PAT. No. 6,218,737.

CROSS-REFERENCE TO RELATED APPLICATIONS

This application claims priority upon German application 197 47 949.9 filed Oct. 30, 1997, which is incorporated herein by reference.

BACKGROUND OF THE INVENTION

The invention relates to a device for setting the length of a top link of a tractor attaching device. The attaching device, apart from a top link, also includes two lower steering arms. The two lower steering arms are arranged so as to be laterally displaced from the longitudinal axis of the tractor and are articulatably attached at one end. The top link has a power drive which is used for length setting.

A publication entitled "Hydraulic Top Link with Hook" of GKN Walterscheid GmbH, Lohmar, Germany (TAS 156/I D/GB/F 996 G10-I 309562) describes a top link with a hydraulic cylinder used as a power drive. It has a double-acting piston-cylinder unit with a twin return valve (double check valve). The valve serves to block the set length even in the case of longer periods of rest A marking rod is also provided, which facilitates handling.

Achieving the optimum length setting for the top link when the tractor operates with an attached implement requires considerable experience. The operative always has to carry out a manual operation to adapt the length setting. This is labor-intensive and optimum kinematic conditions for the respective implement are not achieved.

SUMMARY OF THE INVENTION

It is an object of the present invention to provide a device which achieves optimum kinematics in operation for each attached implement.

In accordance with the invention, a device for setting the length of a top link forms part of an attaching device of a tractor. A displacement sensor is provided which records the respective actual length setting of the top link. The sensor generates an electric actual length signal which represents the actual length setting. A lift position sensor is present to generate an electric signal which represents the actual lift position of the lower steering arms. A storage unit is present to store a nominal length setting of the top link. The nominal length setting relates to the respective actual lift position. When a new actual lift position is reached, the storage unit generates an electric control signal corresponding to the nominal length signal. The control unit actuates the power drive as a function of the deviation of the respective actual length setting from the control signal.

An advantage of this embodiment is that the respective kinematics meet greatly differing requirements. The operative is offered specific functional improvements and greater comfort. It is possible to achieve kinematics which are adapted to a specific implement. The required predetermined values may be entered by hand It is also possible to enter into the storage unit a specific tractor/implement combination in the form of a special program.

According to a further embodiment, the respective nominal length settings relative to the associated lift positions can be stored in the storage unit in the form of a curve. In this context, the two end points of the curve are stored in the storage unit by moving to the highest lift position, in combination with a first nominal length setting and, respectively, to the lowest lift position, in combination with a second nominal length setting of the top link with the implement connected to the attaching device. This means that the end points of the curve can be adapted for each tractor/implement combination. For most applications, the curve may be presented by a straight line extending between the end points. However, it may also be necessary to store a special curve. The decisive factors are the two end points which are stored by a so-called "teach-in" method. Accordingly, while the end positions are stored, it is also possible to store intermediate positions between the two end positions. The intermediate positions may be individually stored. The intermediate positions are created by lifting the lower steering arms to a first position, then manually adjusting the top link to a position so that the implement attached to the lower steering arms and the top link assumes the first position. Thus, this given lifting position of the lower steering arms is stored as an intermediate position. This process may be carried out to produce additional intermediate positions.

The invention can be complemented by arbitrarily changing the curve by changing the length setting of the top link. Thus, a curve is obtained with a discontinuity from which two straight lines are assumed to extend to the end points. Finally, it is possible to store curves for several different implements in the storage unit. Thus, the curves may be activated when the respective implement is connected to the attaching device.

In a preferred embodiment, the power drive for the top link is a hydraulically loadable piston/cylinder unit. The control unit is preferably a microprocessor. It is possible to select different operational conditions. Thus, the respective nominal length setting for the top link represents a function of the lift position of the lower steering arms.

The control means permt different operational conditions which can be determined, for instance, by an operation selection switch. In a first position, for instance in the "off" position, the control unit is deactivated and the length of the top link cannot be changed. In a second selectable position, the "automatic" position, it is possible to automatically control the length of the top link as a function of the position within control range limits. Outside the control range limits, the length remains constant.

A third type of operation exists, the "floating position". This position differs from the automatic type of operation in that the length between the control range limits is not controlled. The power drive of the top link is disconnected. Furthermore, a "manual" type of operation is possible. Here, the length of the top link is set by hand. In this case, the power drive is controllable by hand, so that any kind of setting is possible.

Further, in the "automatic" position and in the "floating" position, it is possible to superimpose manual operation. This permits temporary adjustments, for instance, changing the angle of attack of the working tool. Finally, it is possible, in addition to manual control facilities, to provide remote control means. This permits control by radio or by a cable connection. These control means permit the most varied requirements to be met by the kinematics. The user benefits from specific functional improvements and greater comfort From the following detailed description, taken in conjunction with the accompanying drawings and subjoined claims, other objects and advantages of the present invention will become apparent to those skilled in the art.

BRIEF DESCRIPTION OF THE DRAWINGS

The drawing diagrammatically shows a tractor and an attached implement as well as the attaching device. Also, part of the device for controlling the length settings is shown. Further, the drawings show a number of variants regarding the curves which are used The design and mode of operation of the device in accordance with the invention are explained in greater detail with reference to the following drawings wherein.

DETAILED DESCRIPTION OF THE PREFERRED EMBODIMENT

Figure 1:
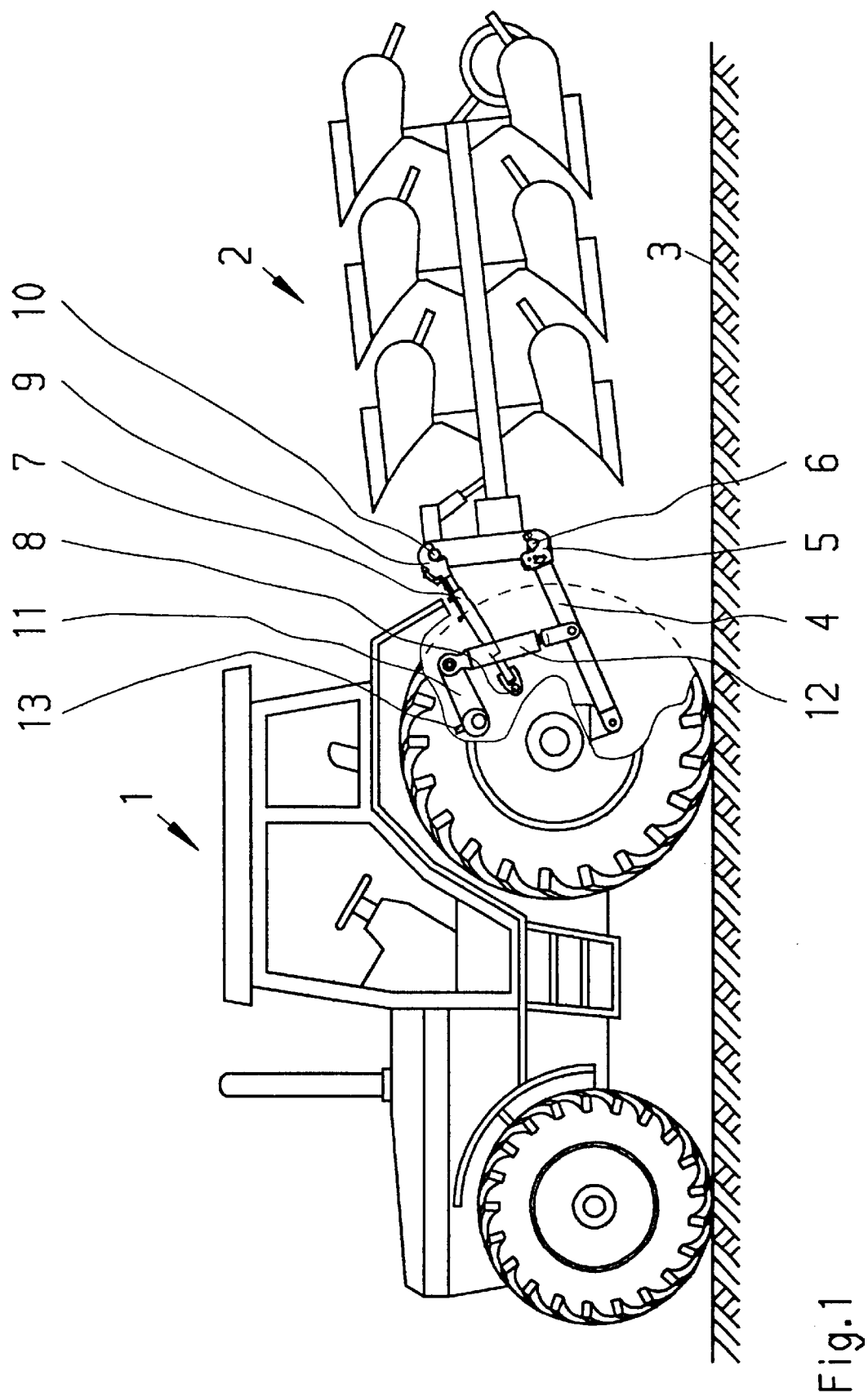
FIG. 1 is a diagrammatic view of a tractor with an implement connected to the attaching device of the tractor.

FIG. 1 illustrates a tractor 1 with an attached implement. The tractor 1 is drivable on the ground 3 which is intended to be worked by the implement 2. At the rear of the tractor 1, two lower steering arms 4 are provided which are laterally displaced from the longitudinal axis. One end of the arms is articulatably connected to the tractor 1. The other end of the arms is provided with a coupling hook 5. Only one of the two lower steering arms 4 is shown. The coupling hooks 5 of the lower steering arms 4 are connected to corresponding coupling means 6 of the implement 2. Above the two lower steering arms 4, a top link 7 is connected by an articulated connection 8 to the rear of the tractor. At its free end, the top link 7 is provided with a coupling hook 9. The coupling hook 9 is connected to coupling means 10 at the implement 2.

The two lower steering arms 4 are each connected by a lifting strut 12 to a lifting arm 11. The lifting arms are connected to a power drive for the purpose of setting the height of the coupling point represented by the coupling hook 5 receiving the implement 2. The lifting arm 11 is associated with a lift position sensor 13. The sensor 13 generates a signal which is proportional to the lift position of the lower steering arm 4.

Figure 2:
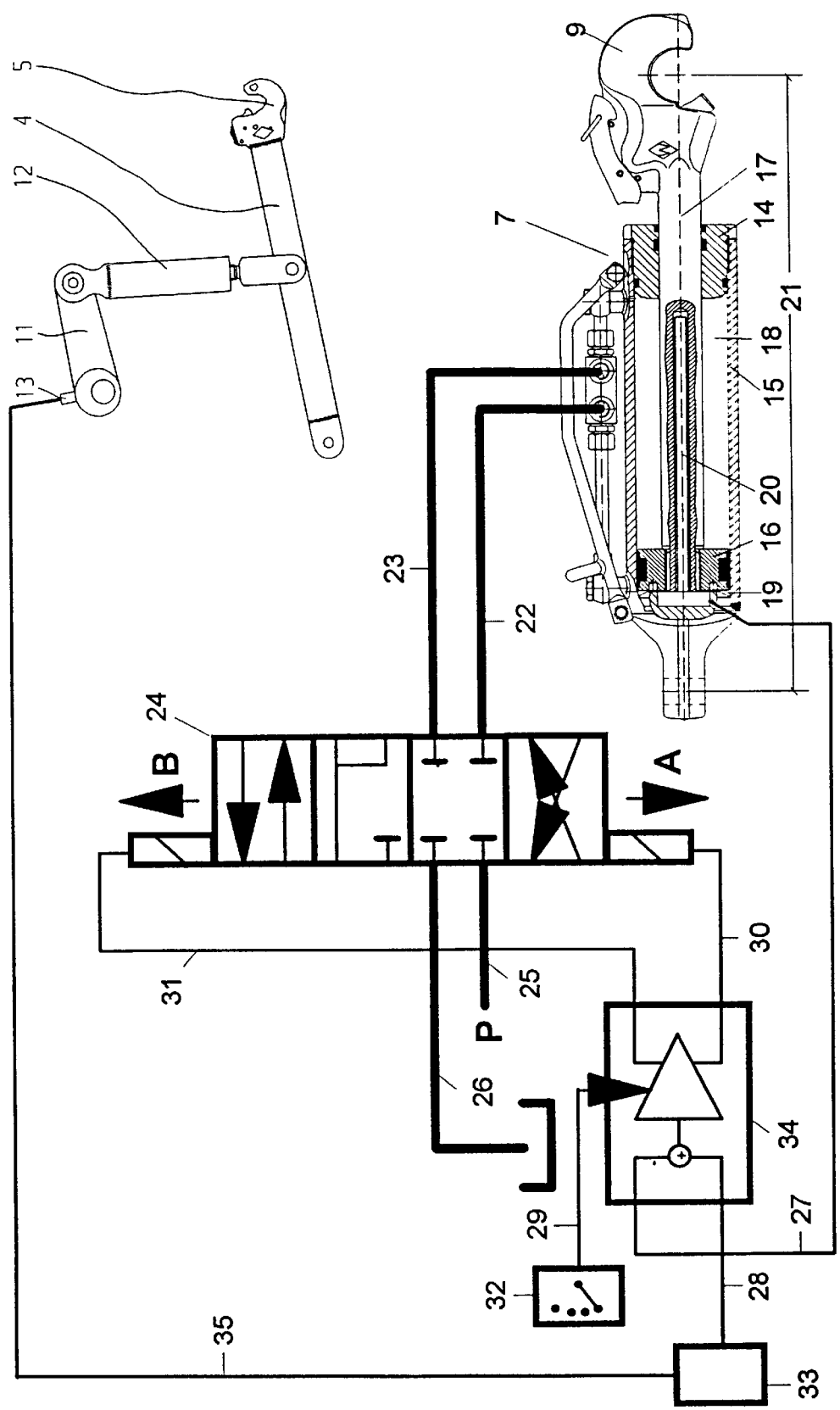
FIG. 2 is a diagrammatic view of a design of the device in accordance with the invention in combination with other components of the attaching device.

FIG. 2 shows the design of an attaching device having a lower steering arm 4, the connected coupling hook 5, the lifting strut 12 for setting purposes, the lining arm 11 connected to the strut 12, and the lift position sensor 13. Furthermore, the top link 7 is shown in detail. The top link 7 is a hydraulic top link with a piston/cylinder unit 14. The unit has a cylinder housing 15. One end of the housing is engaged by means providing an articulated connection with the tractor.

A piston 16 is displaceably received in the cylinder housing 15. At its end projecting from the cylinder housing 15, the piston rod 17 connected to the piston 16 caries the coupling hook 9. The top link is shown in its retracted position where the actual length setting is represented by the reference number 21. This means that the piston 16 is in its furthest retracted position. Thus, the cylinder chamber 19 at the piston end is at its minimum. The cylinder chamber 18 at the piston rod end is at its maximum.

The cylinder housing 15 is associated with a displacement sensor 20. The sensor 20 is connected to the base of the cylinder housing 15. The base is remote from the coupling hook 9. The sensor 20 includes a bar-shaped portion which projects into a bore of the piston 16 and the piston rod 17, respectively. The sensor 20 transmits an electric actual length signal representing the respective actual length setting 21 to a control line 27. The control signal is transmitted by the control line 27 to a control unit 34.

The lift position sensor 13 is connected by a control line 35 to the storage unit 33. The lift position sensor 13 generates an electric control signal which is proportional to the lift position of the lower steering arms. The storage unit, in turn, is connected by a control line 28 to the control unit 34.

The curves stored in the storage unit 33 can be activated for a specific implement and fed in by the "teach-in" method. Thus, via the control line 28, the control unit 34 is provided with a nominal length setting of the top link 7 associated with each specific lift position. The nominal length setting signal, when a corresponding lift position is reached, is transmitted by the lift position sensor 13, via the control line 35, to the storage unit 33. The signal is passed onto the control unit 34 in the form of an electric control signal. The control unit 34 has a comparator which generates a control signal. The control signal actuates a switching valve 24 as a function of the deviation of the actual length setting of the top link 7 from the nominal length setting.

The switching valve permits different positions which will be described in greater detail below. The switching valve includes two ports leading to the top link 7. The ports establish a connection with the first connecting line 22, the second connecting line 23, a pressure line 25 connected to a pump or pressure agent supply source of the tractor, a return line 26 leading to the tank, or the ports establish a connection relative to one another.

In the position as indicated, the switching valve 24 is in the shut-off position. This means that the two connecting lines 22, 23 are disconnected from the pressure line 25 and from the return line 26. If the switching valve 24 is switched in the direction of arrow A by one position, the two connecting lines 22, 23 are connected to one another and to the return line 26. The connection with the pressure line 25 remains shut off. In this position, the actual length setting 21 can be changed freely. This position is the "floating position" which can be predetermined by a pre-selection switch 32. An exchange of pressure agent takes place between the cylinder chamber 18 at the piston rod end and the cylinder chamber 19 at the piston end via the connecting line 22, 23. The lines 22, 23 are short-circuited relative to one another. As, when shortening the length setting, more volume flows out of the cylinder chamber 19 at the piston end than can be accommodated by the cylinder chamber 18 at the piston rod end. The additional volume escapes through the port leading to the return pipe 26. Tis operating position is chosen, if the attached implement engages the ground and if the top link 7 only has a guiding function without having to accommodate any forces in sense of carrying the implement. Such a mode of operation is also obvious from the curve shown in FIG. 4.

If the control unit 34 indicates that the nominal length setting, starting from an actual length setting, requires an increase in the length of the top link 7, when the operation selection switch 32 is set to "automatic", the switching valve 24 is switched in direction A. In this position, the pressure line 25 is connected to a first connecting line 22 leading to the cylinder chamber 19 at the piston end. The second connecting line 23, connected to the cylinder chamber 18 at the piston rod end, is connected to the return line 26. In this position, the actual length setting 21 is increased. Thus, the piston rod 17, with the coupling hook 9, moves out of the cylinder housing 15. The cylinder chamber 19 at the piston end is filled with pressurized fluid. The cylinder chamber 18 at the piston rod end is emptied, via the second connecting line 23 and the return pipe 27 towards the tank. This process continues until the nominal length setting, transmitted via the storage unit 33 to the control unit 34, corresponds to the actual length setting.

If the storage unit, as a result of the position of the lower steering arm 4, specifies, via the position sensor 13, a position which requires shortening of the top link 7, starting from its actual length setting which is provided by the control unit 34 comparator by comparing the signal of the displacement sensor 20 with that predetermined by the storage unit 33, the switching valve 24 is switched in the direction of arrow B. Thus, a connection is made between the pressure line 25 and the second connecting line 23. Furthermore, a connection is made between the first connecting line 22 and the return line 26. In this way, the cylinder chamber 18 at the piston rod end is pressured with pressurized fluid. The pressurization continues until the comparison of the control signal of the displacement sensor 13, with the signal transmitted to the control unit 34, towards the nominal length setting, has resulted in corresponding values. In addition to the two positions as described above, the operation selection switch 32 also has an "off" position. The "off" position corresponds to the illustrated shut-off position in which an exchange of pressure agent cannot take place and the actual length setting 21 remains the same.

In addition, the operation selection switch 32 has a position in which the switching valve 24 can be switched manually in order to achieve the required nominal length setting of the top link 7. Further, the control signals of the control unit 34 can also be superimposed manually. Thus, the switching valve 24 can be switched arbitrarily. This switching leads to a temporary change in the length setting of the top link 7.

Figure 3:
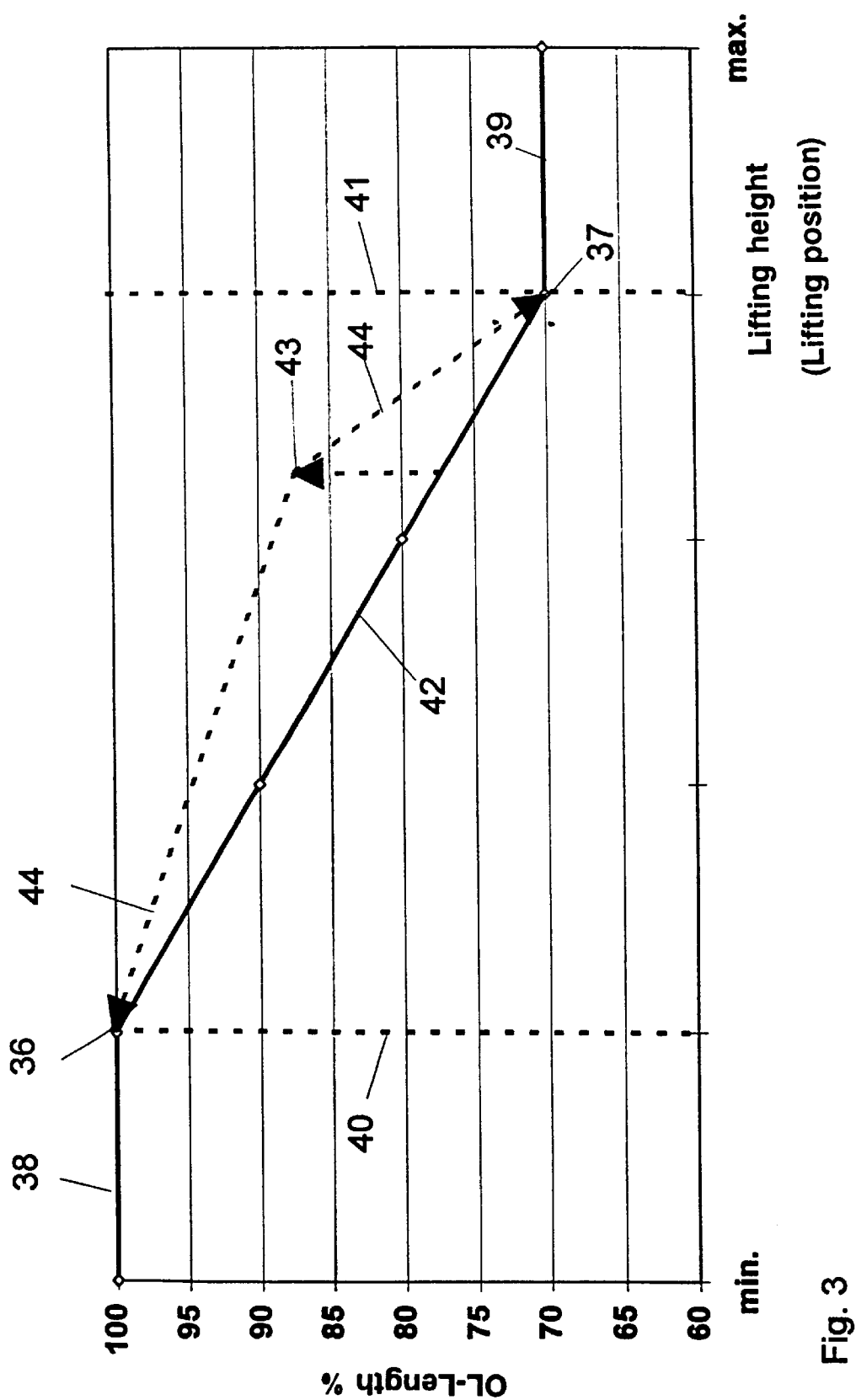
FIG. 3 is a schematic view of a first type of curve which may be used for operating an implement in connection with the tractor carrying the implement.

FIG. 3 describes a possible mode of operation and shows a diagram containing the length of the top link expressed in percent of the maximum top link length as a function of the height of the lift position of the lower steering arms.

The device in accordance with the invention enables a direct specification of a curve 42 or the assumption of a straight line between the two end points 36, 37. The two end points can be determined by the "teach-in" method when an implement is attached to a tractor, thus doing justice to the special tractor/implement combination. The end point 36 characterizes the lower limit position. Thus, end point 36 is the lowest end point which is represented by the control range limit 40 and the second nominal length setting. Outside the control range limit 40, a further increase in length is not possible. Thus, the lower limit value 38 remains constant. This also applies to the upper limit value which, together with the control range limit 41, defines the upper limit position 37 and thus the upper end point 39.

In the present case, the curve 42 between the two end points 36, 37 is assumed to be a straight line. Thus, a linear change (percent) in the top link length exists as a function of the change in the height of the lift position from a minimum towards a maximum between the two control range limits 40, 41. If, as a result of special conditions, a manual operation is needed, the top link length can be temporarily changed. Thus, a new nominal value 43 is set as a result of the control means being manually superimposed.

Thus, a new curve 44 is obtained with a discontinuity in the range of the new nominal value 43. If subsequently the length is automatically further increased, the top link length is adapted in accordance with the two straight lines between the end points 36 and 37 and the discontinuity 43 existing therebetween. The arms of the new curve have each been given the reference number 44.

Figure 4:
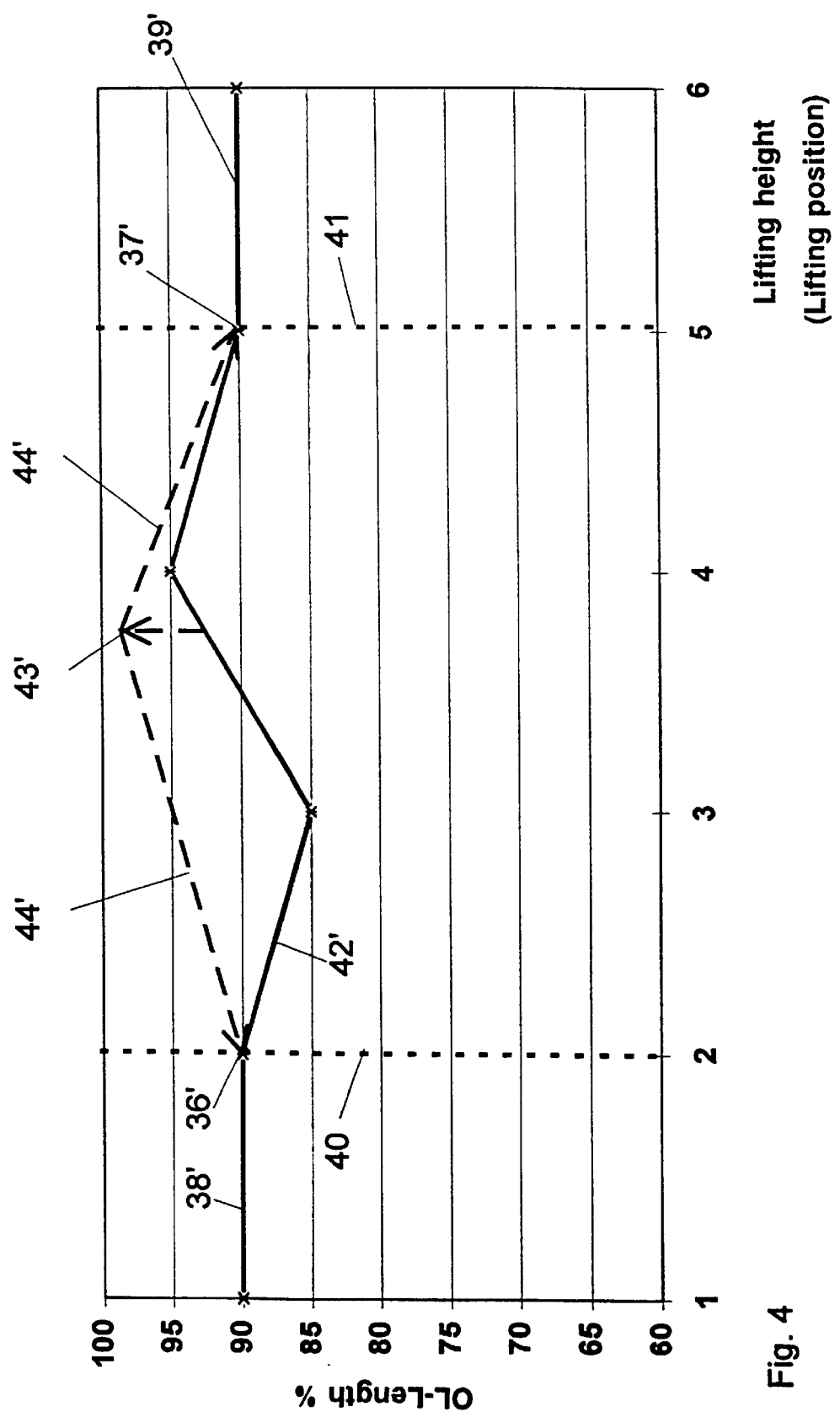
FIG. 4 is a schematic view of a curve in the operational "floating" position.

FIG. 4 also shows a diagram where the top link length (OL-length) is expressed as a percent of a total length. The height of the lift position from a minimum to a maximum is entered vertically and horizontally. Again, there exists outside control range limits in which a change in the top link length cannot take place. This is represented by the two upper and lower limits 38', 39'. Between the two end points 36', 37', any setting is possible. Here, the operation selection switch is switched to a "floating position". In consequence, the curve 42' can have any form between the end points 36', 37'. If, as a result of special conditions, manual operation is necessary, such as the elimination of the floating position, the top link length can be temporarily changed. Thus, as a result of the control means being superimposed, a nominal value 43' is obtained. The control system now operates within the control range limits 40, 41. This is analogous to the automatic mode of operation and a new curve 44 is obtained. When the control range limits 40, 41 are exceeded, a constant length is set outside the control range. However, while inside the control range, the floating position is permitted again.

While the above detailed description describes the preferred embodiment of the present invention, the invention is susceptible to modification, variation and alteration without deviating from the scope and fair meaning of the subjoined claims.

What is claimed is:

1. A device for setting the length of a top link of an attaching device of a tractor, comprising:
   a top link;
   two lower steering arms;
   a power drive directly coupled with said top link for providing length settings of said top link;
   a displacement sensor for generating an electric actual length signal which represents the respective actual length setting of the top link;
   a lift position sensor for generating an electric signal representing the actual lift position of the lower steering arms;
   storage unit for storing a nominal length setting of the top link, said nominal length setting relates to the respective actual lift position, and when a new actual lift position is reached, said storage unit generates an electric control signal corresponding to the nominal length setting of the top link; and
   a control unit including a comparator comparing the control signal with the actual length signal and actuating the power drive as a function of the deviation of the respective actual length signal from the control signal.

2. A device according to claim 1, wherein the respective nominal length settings can be stored in the storage unit relative to the associated lift positions in the form of a curve.

3. A device according to claim 2, wherein two end points of the curve can be stored in the storage unit by moving to the highest lift position in combination with a first nominal length setting and, respectively, to a lowest lift position in combination with a second nominal length setting of the top link with the implement connected to the attaching device.

4. A device according to claim 3, wherein the curve is represented by a straight line extending between the end points.

5. A device according to claim 4, wherein the curve can be changed by arbitrarily changing the length setting of the top link into a curve with a discontinuity and two straight lines extending from said discontinuity to the end points.

6. A device according to claim 2, wherein curves for several different implements can be stored in the storage unit and activated therefrom.

* * * * *

UNITED STATES PATENT AND TRADEMARK OFFICE
CERTIFICATE OF CORRECTION

PATENT NO. : 6,420,798 B2
DATED : July 16, 2002
INVENTOR(S) : Wolfgang Adamek, Herbert Coenen and Holger Jung It is certified that error appears in the above-identified patent and that said Letters Patent is hereby corrected as shown below:

Column 2,
Line 40, "permit" should be -- permit --.

Column 3,
Line 52, "lining" should be -- lifting --.
Line 61, "caries" should be -- carries --.

Column 4,
Line 56, "Tis" should be -- This --.

Column 6,
Line 51, before "storage", insert therefor -- a --.

Signed and Sealed this

Fifth Day of August, 2003

JAMES E. ROGAN
*Director of the United States Patent and Trademark Office*